United States Patent

Suzuki et al.

[11] Patent Number: 6,154,154
[45] Date of Patent: Nov. 28, 2000

[54] DIGITAL SIGNAL PROCESSOR AND CONTROL METHOD FOR CHANGEOVER OF SAMPLING FREQUENCY

[75] Inventors: Yasuyuki Suzuki; Tsunetaka Matsuo, both of Kanagawa-ken, Japan

[73] Assignee: Kabushiki Kaisha Toshiba, Kawasaki, Japan

[21] Appl. No.: 09/179,548

[22] Filed: Oct. 28, 1998

[30] Foreign Application Priority Data

Oct. 29, 1997 [JP] Japan ................................ 9-297401

[51] Int. Cl.[7] ............................................ H03M 7/00
[52] U.S. Cl. ................................... 341/61; 710/52
[58] Field of Search .................. 341/61, 123; 710/52, 710/53, 54, 58, 59, 60, 61

[56] References Cited

U.S. PATENT DOCUMENTS

| | | | |
|---|---|---|---|
| 5,617,088 | 4/1997 | Yasuda | 341/61 |
| 5,644,310 | 7/1997 | Laczko, Sr. et al. | 341/143 |
| 5,703,877 | 12/1997 | Nuber et al. | 370/395 |

FOREIGN PATENT DOCUMENTS

0 776134 A2  5/1997  European Pat. Off. .

*Primary Examiner*—Howard L. Williams
*Attorney, Agent, or Firm*—Oblon, Spivak, McClelland, Maier & Neustadt, P.C.

[57] ABSTRACT

A frequency counter detects a sampling frequency of an input digital signal. If a control circuit is notified that the sampling frequency of the input digital signal changes according to a signal from the frequency counter, it temporarily stops accumulation of input digital signal in a data memory. An operation processing circuit continues operation processing on the input digital signal accumulated in the data memory at that time. After the operation processing terminates, the control circuit reads a program and processing data corresponding to the changed sampling frequency from a program memory and a coefficient/offset data memory and sets them in the operation processing circuit. After that, the operation processing circuit restarts operation processing.

9 Claims, 6 Drawing Sheets

DIGITAL SIGNAL PROCESSOR AND CONTROL METHOD FOR CHANGEOVER OF SAMPLING FREQUENCY

BACKGROUND OF THE INVENTION

1. Field of the Invention

This invention relates to a digital signal processor for processing audio digital signals to perform equalizing or adding of reverberate sound, and a control method for changeover of the sampling frequency of the digital signal.

2. Description of the Related Art

Figure 1:
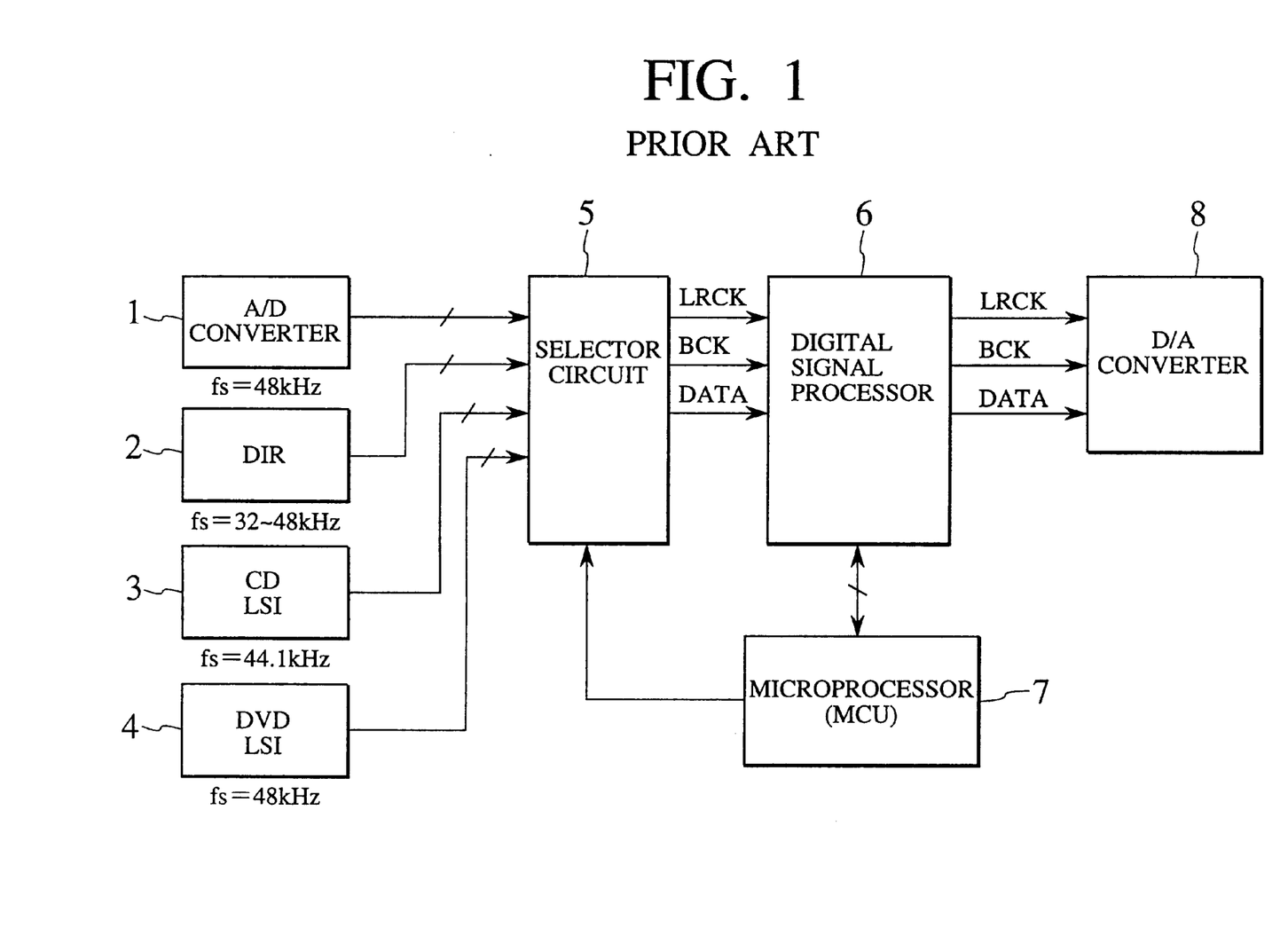
FIG. 1 is a block diagram showing an example of a structure of a system using a conventional digital signal processor.

A conventional digital signal processor is capable of changeover and processing of several kinds of audio digital signals (hereinafter referred to simply as digital signal) each having a different source and is used in a system shown in FIG. 1. Referring to FIG. 1, digital signal from an A/D converter 1 for converting analog data to digital data, digital audio interface receiver (DIR) 2 for outputting optical signal from a mini disc (MD) player in the form of a digital signal, CDLSI 3 for outputting a digital signal read from a compact disc (CD), a DVDLSI 14 for outputting a digital signal read from a digital video disc (DVD) or the like is input to a digital signal processor 6 through a selector circuit 5 as a source of object digital signal for processing.

A microprocessor 7 controls the selector circuit 5 so as to change over the selector circuit 5 so that a digital signal corresponding to a source selected by user's key operation is input to the digital signal processor 6. At the same time, the microprocessor (MCU) 7 sets a processing program and processing data such as coefficient data, offset data, and the like corresponding to a sampling frequency of a selected digital signal in the digital signal processor 6.

The digital signal processor 6 is supplied with left/right identification clock LRCK for identifying left and right channels of an audio signal and bit clock BCK for sending digital signal DATA as well as digital signal DATA which is object audio data for processing. Usually, a sampling frequency of an object digital signal for processing is specified by the left/right identification clock LRCK so that the digital signal processor 6 carries out processing of input digital signal DATA smoothly.

After the input digital signal is subjected to equalizing, addition of reverberate sound, surrounding processing or the like, the digital signal processor 6 outputs to the D/A converter 8. The D/A converter 8 converts the input digital signal DATA to analog data and then outputs to an audio amplifier (not shown) or the like on a next stage.

If the kind of a source of an object digital signal for processing is changed over by user's key operation (not shown), the microprocessor 7 sets a corresponding processing program or processing data in the digital signal processor 6, which carries out processing of a source selected by the user.

Here, because a processing program for processing digital signal DATA which is operated inside the digital signal processor 6 carries out processing synchronous with the sampling frequency, the processing program and processing data such as coefficient data and offset data must be changed over each time when the sampling frequency of an object digital signal DATA for processing is changed over.

Particularly, in case of a digital filter operation and data delay processing using memory, the processing data (coefficient data, delay memory offset data and the like) differs depending on each sampling frequency. Therefore, the changeover of the processing data by the microprocessor 7 corresponding to a changeover of the sampling frequency is a very important processing.

When the sampling frequency of digital signal DATA of an object for processing is changed over during program processing by the digital signal processor 6, the program processing action becomes unstable, so that a processed digital signal DATA becomes unstable. Thus, in case processing program or processing data for the digital signal processor 6 is replaced by the microprocessor 7, output stop of processed digital signal DATA or operation stop of the processing program in the apparatus also must be controlled from the outside by the microprocessor 7.

In a system having to make the digital signal processor 6 carry out processing of a great deal of processing program and processing data, a burden of the control program of the microprocessor 7 increases, so that halt time of output signal during a replacement control of the aforementioned processing program or processing data is prolonged and further, the other control by the microprocessor 7 get into trouble.

In case the sampling frequency deviates from a predetermined frequency or the frequency becomes zero, disabling any input, this is called noise in the sampling frequency. When this noise occurs also, such a control as an operation stop of an operation processing circuit in the digital signal processor 6 is executed so as to prevent any uncomfortable sound from being output outside by the microprocessor 7. This control also gives a burden on the microprocessor 7, thereby producing the same problem as described above.

Although, to avoid this problem, use of a high speed microprocessor 7, expansion of work memory of the microprocessor 7, adding of a mask ROM or the like is necessary, these countermeasures induce an increase of system production cost.

SUMMARY OF THE INVENTION

The present invention has been achieved to solve the above described problem. A first object of the invention is to provide a digital signal processor capable of carrying out replacement of a processing program and a processing data voluntarily and rapidly, corresponding to a changeover of a sampling frequency of an object data for processing, without any burden on an outside control unit and an increase of the price of this apparatus, and a sampling frequency changeover control method for the same.

A second object of the invention is to provide a digital signal processor capable of preventing an output of uncomfortable sound by voluntarily taking an appropriate noise countermeasure without any burden on the outside control unit and an increase of the price of the apparatus, in case noise exists in the sampling frequency.

To achieve the above objects, there is provided a digital signal processor comprising: an operation processing circuit for carrying out operation processing on input digital signal by using a processing program and processing data set corresponding to a sampling frequency possessed by the digital signal; and a control means for detecting the sampling frequency of the input digital signal and controlling the operation processing circuit so as to carry out a processing corresponding to the detected sampling frequency.

According to the present invention, the operation processing circuit carries out operation processing on an input digital signal by using the processing program and processing data set corresponding to the sampling frequency possessed by the digital signal. The control means detects the sampling frequency of the input digital signal and controls the operation processing circuit so as to carry out a processing corresponding to the detected sampling frequency.

According to a preferred embodiment of the present invention, upon detecting that the sampling frequency of the input digital signal is changed over, the control means sets a processing program and a processing data corresponding to the changed-over sampling frequency in the operation processing circuit.

According to this embodiment, for example if the digital signal source is changed from CD to DVD, the sampling frequency of the digital signal is also changed over. At that time, the control means voluntarily sets a processing program and processing data corresponding to the changed-over sampling frequency in the operation processing circuit. Therefore, the above described control processing can be carried out rapidly without any burden on an outside control unit, thereby reducing an apparatus halt time at the time of sampling frequency changeover. As a result, the digital signal processor is capable of executing a processing on the digital signal without any trouble.

According to another preferred embodiment of the present invention, the control means comprises: a memory for storing a plurality of processing programs and a plurality of processing data corresponding to sampling frequencies of a plurality of digital signals to be input; a frequency detecting means for detecting the sampling frequency of the input digital signal; and a control circuit, when the frequency detecting means detects that the sampling frequency of the input digital signal is changed over, for reading a processing program and processing data corresponding to the detected sampling frequency and then setting the processing program and processing data in the operation processing circuit.

According to still another preferred embodiment of the present invention, the digital signal processor further comprises: a digital signal memory for temporarily storing the input digital signal, wherein, when the frequency detecting means detects that the sampling frequency of the input digital signal is changed over, the control circuit stops a supply of the input digital signal to the digital signal memory, and then stops an operation of the operation processing circuit after the digital signal accumulated in the digital signal memory at a time of the detection is processed by the operation processing circuit, and then reads a processing program and processing data corresponding to the detected sampling frequency and sets the processing program and processing data in the operation processing circuit.

According to a further preferred embodiment of the present invention, upon detecting that the sampling frequency of the input digital signal deviates, the control means stops a supply of the input digital signal to the operation processing circuit, and upon detecting that the sampling frequency of the input digital signal is stabilized, the control means restarts the supply of the input digital signal to the operation processing circuit.

According to this embodiment, while the sampling frequency deviates, the operation processing on the digital signal by the operation processing circuit is stopped. Thus, an inappropriate signal output due to an influence of noise never occurs. Particularly in case the output signal is audio signal, a listener never embrace uncomfortable feeling due to noise.

According to a still further preferred embodiment of the present invention, the digital signal processor further comprises a digital signal memory for temporarily storing the input digital signal, wherein, upon detecting that the sampling frequency of the input digital signal deviates, the control means stops a supply of the input digital signal to the digital signal memory; the operation means continues processing of digital signal accumulated in the digital signal memory at a time of the detection; and upon detecting that the sampling frequency of the input digital signal is stabilized, the control means restarts the supply of the input digital signal to the digital signal memory.

According to a further preferred embodiment of the present invention, upon not detecting the sampling frequency, the control means stops an operation of the operation processing circuit.

According to a further preferred embodiment of the present invention, the digital signal processor further comprises a digital signal memory for temporarily storing the input digital signal, wherein, upon not detecting the sampling frequency, the control means stops an operation of the operation processing circuit after the digital signal accumulated in the digital signal memory at a time of the non-detection is processed by the operation processing circuit.

To achieve the above object from another aspect, there is provides a sampling frequency changeover control method for a digital signal processor having an operation processing circuit for carrying out operation processing on an input digital signal by using a processing program and processing data corresponding to a sampling frequency possessed by the input digital signal, the method comprising the steps of: detecting the sampling frequency of the input digital signal; when the detecting step detects that the sampling frequency of the input digital signal is changed over, reading a processing program and processing data corresponding to the changed-over sampling frequency from a memory storing a plurality of processing programs and a plurality of processing data corresponding to sampling frequencies of a plurality of digital signals to be input; and setting the read processing program and processing data in the operation processing circuit.

The nature, principle and utility of the invention will become more apparent from the following detailed description when read in conjunction with the accompanying drawings.

DESCRIPTION OF THE PREFERRED EMBODIMENTS

Hereinafter, the embodiments of the present invention will be described with reference to the accompanying drawings.

Figure 2:
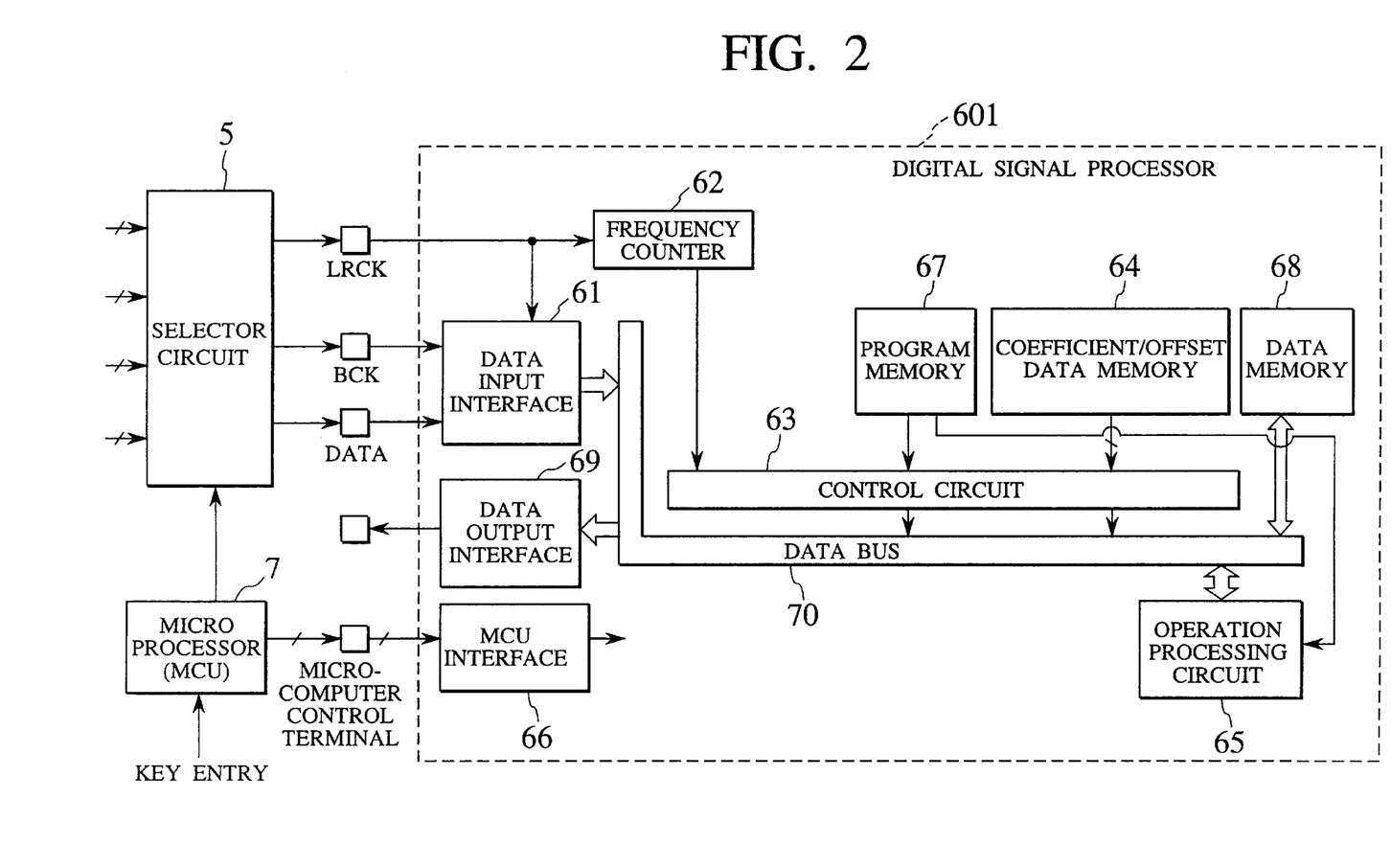
FIG. 2 is a block diagram showing an example of a structure of a first embodiment of a digital signal processor according to the present invention.

FIG. 2 is a block diagram showing an example of a structure of a first embodiment of a digital signal processor of the present invention.

A data input interface 61 inputs left/right identification clock LRCK, bit clock BCK and digital signal DATA into a data bus 70. A frequency counter 62 counts a frequency of the left/right identification clock LRCK so as to detect a sampling frequency of the digital signal DATA and then inputs this into a control circuit 63. The control circuit 63 carries out setting of processing data or processing program corresponding to the detected sampling frequency for an operation processing circuit 65.

A program memory 67 is constituted of a ROM and accommodates various processing programs of the operation processing circuit 65. A coefficient/offset data memory 64 is constituted of a ROM and stores various processing data for use in the operation processing circuit 65 in a form corresponding to various sampling frequencies. A data memory 68 is constituted of a RAM or the like and contains a buffer function for temporarily storing an object digital signal DATA for processing input from the data input interface 61. The operation processing circuit 65 carries out an operation corresponding to each of various processing such as equalizing and surrounding for the object digital signal DATA for processing. A data output interface 69 outputs digital signal DATA subjected to arithmetic operation by the operation processing circuit 65 to an outside D/A converter 8. A MCU interface 66 inputs key input information and the like from a microprocessor 7 into this apparatus. Reference numeral 70 designates a data bus through which digital signal DATA and control data are transmitted in the apparatus. Preferably, the frequency counter 62 and control circuit 63 are constituted of hardware.

Figure 3:
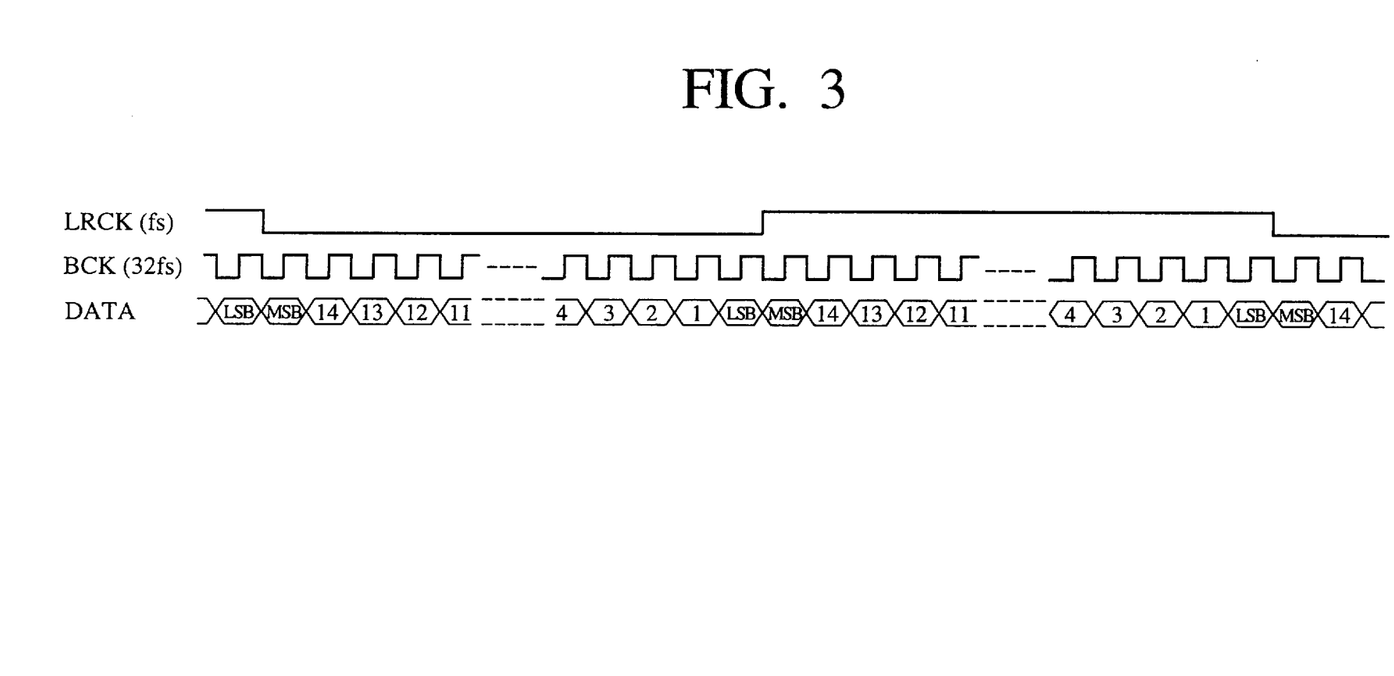
FIG. 3 is a waveform diagram showing an example of a signal to be input into an apparatus shown in FIG. 2.

Next, an operation of this embodiment will be described. The data input interface 61 inputs the left/right identification clock LRCK, bit clock BCK and digital signal DATA as shown in FIG. 3 into the apparatus. At this time, the frequency counter 62 counts a frequency of the left/right identification clock LRCK so as to detect the sampling frequency of the digital signal DATA and notifies the control circuit 63 thereof.

The control circuit 63 reads out a processing program corresponding to the detected sampling frequency from the program memory 67, reads out a processing data from the coefficient/offset data memory 64 and sets it in the operation processing circuit 65.

Particularly upon initial setting, the processing program and processing data can be set in the operation processing circuit 65 corresponding to user's key operation information like in the conventional art. That is, the control circuit 63 reads out processing program and processing data respectively from the program memory 67 and the coefficient/offset data memory 64 corresponding to an instruction sent from the microprocessor 7 through the MCU interface 66 and sets it in the operation processing circuit 65.

Digital signal DATA input from the data input interface 61 is stored temporarily in the data memory 68 through the data bus 70 for buffering. The operation processing circuit 65 reads digital signal DATA from the data memory 68 and at the same time carries out processing such as equalizing and surrounding for the read digital signal DATA according to a set processing program or processing data. After the processing, the digital signal DATA is output to the D/A converter outside (not shown) from a data output interface 69 through the data bus 70.

Here, it is assumed that the source of the digital signal DATA to be input to the data input interface 61 is changed from, for example, CD to DVD. As a result, the sampling frequency of the digital signal DATA is changed over, so that the frequency counter 62 detects this phenomenon with reference to a frequency of the left/right identification clock LRCK, and notifies the control circuit 63 that the sampling frequency has been changed over and further of a detected frequency.

If the control circuit 63 is notified of it that the sampling frequency has been changed, it halts supply of the digital signal DATA to the data memory 68. Further, after digital signal DATA accumulated in the data memory 68 at that time is processed in the operation processing circuit 65, an operation of the operation processing circuit 65 is halted. Then, the control circuit 63 specifies a replaced sampling frequency and reads out a processing program corresponding to this sampling frequency from the program memory 67. Further, the control circuit 63 reads processing data such as coefficient or offset data corresponding to the same sampling frequency from the coefficient/offset data memory 64 and sets the read program and processing data in the operation processing circuit 65.

After that, the control circuit 63 restarts supply of the digital signal DATA to the data memory 68 and further restarts an operation of the operation processing circuit 65.

Consequently, a program or processing data corresponding to the replaced sampling frequency is set immediately in the operation processing circuit 65 without the digital signal processor 601 not being entirely stopped, and an appropriate operation processing is carried out for newly input digital signal DATA. Consequently, a waste halt of the apparatus or loss of data is suppressed to its maximum extent and data faithful to input data is output.

Figure 4:
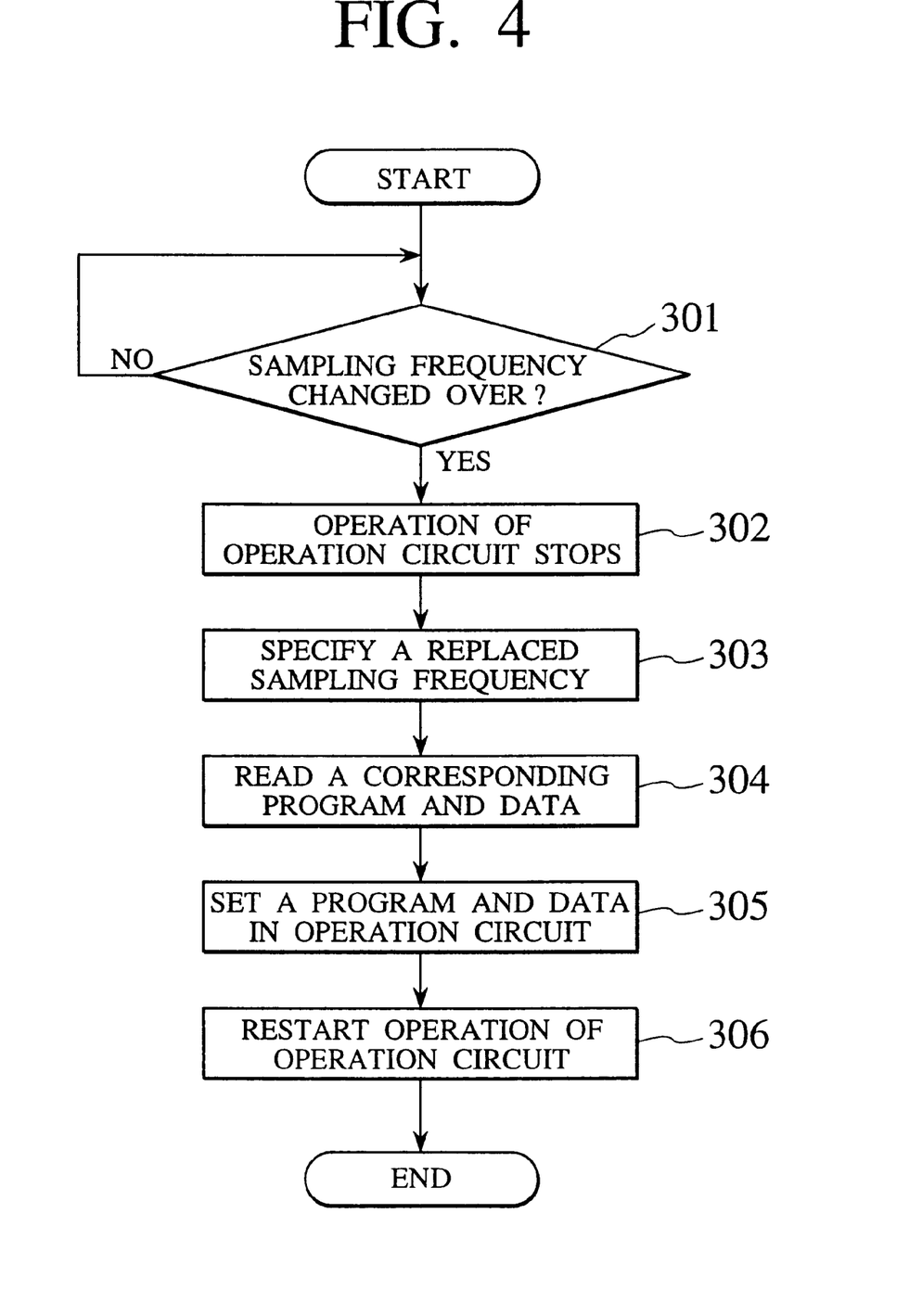
FIG. 4 is a flow chart showing steps of a control operation procedure of the control circuit shown in FIG. 2.

FIG. 4 is a flow chart showing steps of a control operation procedure mentioned above of the control circuit 63. At step 301, the control circuit 63 waits for changeover of the sampling frequency of digital signal DATA to be input and if it detects that the sampling frequency has been changed over, the processing proceeds to step 302, in which a supply of the digital signal DATA to the data memory is halted, the digital signal DATA accumulated in the data memory 68 at that time is processed by the operation processing circuit 65 and after that, an operation of the operation processing circuit 65 is halted. Then, the control circuit 63 specifies a replaced sampling frequency at step 303 and at step 304, processing program and processing data corresponding to this specified sampling frequency are read out from the program memory 67 and coefficient/offset data memory 64, and these data are set in the operation processing circuit 65 at the step 305. Finally, the control circuit 63 restarts a supply of the digital signal DATA to the data memory 68 at step 306 and further, restarts an operation of the operation processing circuit 65.

According to this embodiment, when the sampling frequency of an object digital signal DATA for processing is changed over, the digital signal processor voluntarily detects that the sampling frequency has been changed over and selects a processing program and processing data corresponding to the replaced sampling frequency and sets them in the operation processing circuit 65. Therefore, the operation processing circuit 65 can meet the digital signal DATA in which the sampling frequency has been changed immediately so as to carry out a proper processing on the digital signal DATA. Thus, the processing halt time of the operation processing circuit 65 can be shortened, so that proper audio signal can always be output stably.

Further, because a changeover of the processing program and processing data accompanied by a changeover of the sampling frequency is carried out, preferably, by hardware inside the apparatus at high speed, a load on such a control unit as the outside microprocessor connected to the MCU interface 66 can be reduced, so that the other controls on the apparatus by this microprocessor can be accelerated thereby smooth and quick processing on the digital signal being carried out. Further, because the hardware provided inside the apparatus is not so expensive, the price thereof is not raised so much with the above effects.

Because, preferably, the frequency counter 62 and control circuit 63 are constituted of hardware, the digital signal processor including these circuits can be integrated into a single chip LSI. Meanwhile, the frequency counter 62 and control circuit 63 may be constructed by software.

Figure 5:
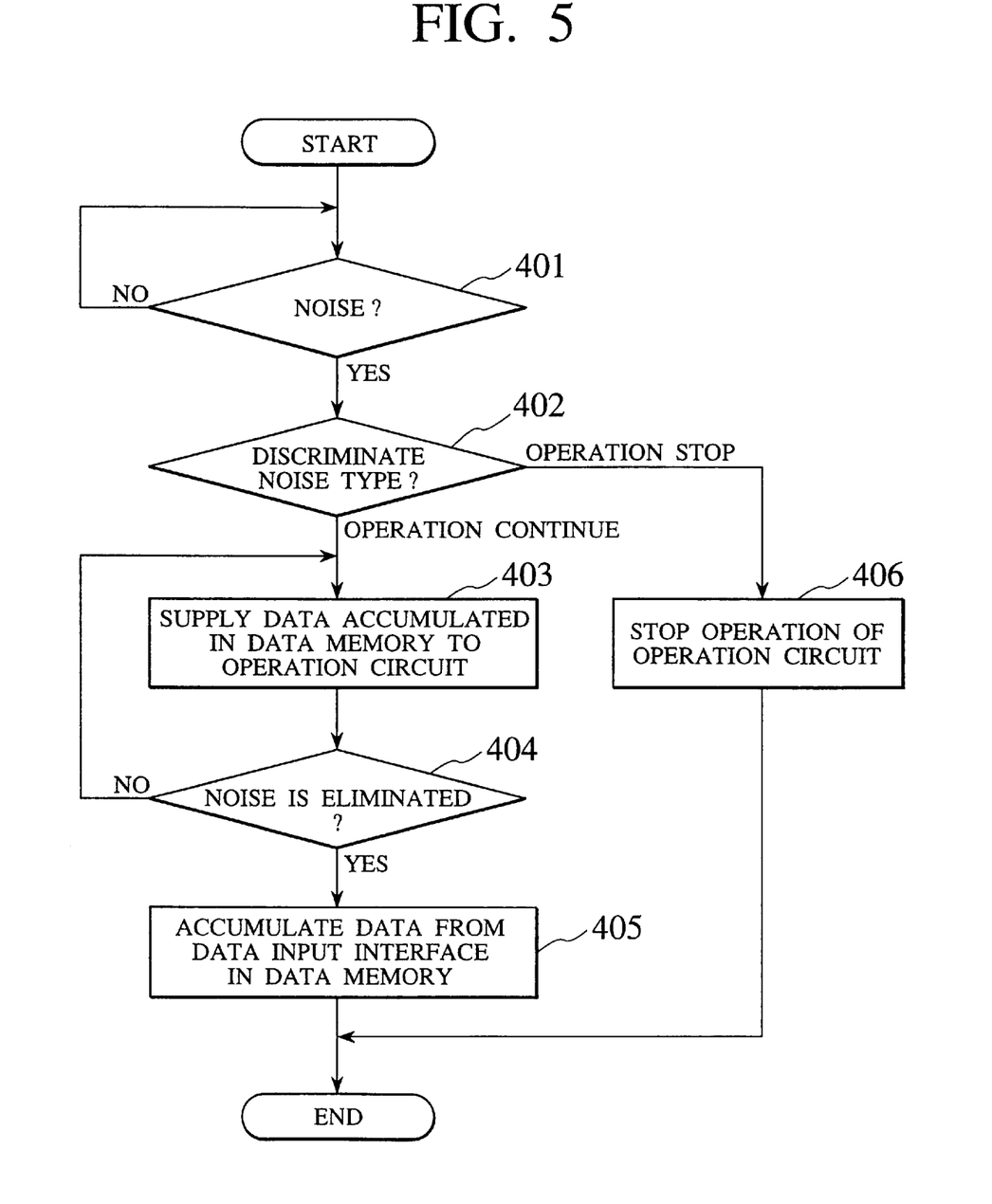
FIG. 5 is a flow chart showing an operation of a second embodiment of a digital signal processor according to the present invention.

FIG. 5 is a flow chart showing an operation of a second embodiment of the digital signal processor of the present invention. The hardware structure of this embodiment will be described using the circuit structure shown in FIG. 2 because it is the same as the first embodiment.

If the control circuit 63 detects that the frequency of the sampling frequency deviates abnormally from a predetermined value or the count becomes zero stopping the input, according to a count action of the frequency counter 62, it determines this to be noise and then executes a control according to a flow chart shown in FIG. 5.

If at step 401, a noise is detected, the processing proceeds to step 402, the control circuit 63 determines a kind of the noise or for example, discriminates a case in which no sampling frequency is detected from a case in which the sampling frequency deviates from a predetermined value. If no sampling frequency is detected, the processing proceeds to step 406 and if the sampling frequency deviates, the processing proceeds to step 403.

At step 403, the control circuit 63 stops accumulation of the digital signal DATA input from the data input interface 61 in the data memory 68 and supplies proper digital signal DATA accumulated in the data memory 68 at that time to the operation processing circuit 65, thereby continuing the proper operation of the operation processing circuit 65. In this while, at step 404, whether or not the noise is eliminated is determined and if the noise is eliminated so that proper sampling frequency is input, the processing proceeds to step 405, in which an operation for accumulating the digital signal DATA to be input from the data input interface 61 to the data memory 68 is restarted, thereby restoring the operation to its proper condition and then the processing is terminated.

On the other hand, if the processing proceeds to step 406, the digital signal DATA accumulated in the data memory 68 at that time is supplied to the operation processing circuit 65, in which it is subjected to operation and output from the data output interface 69 through the data bus 70, and then the control circuit 63 stops the operation of the operation processing circuit 65.

According to this embodiment, in case a noise is detected in the sampling frequency, the digital signal DATA accumulated in the data memory 68 at that time is supplied to the operation processing circuit 65 and subjected to operation processing, and until the noise vanishes, the supply of the digital signal DATA to the data memory 68 is halted. Therefore, an influence by noise can be suppressed to a minimum extent, thereby making it possible to prevent an occurrence of sound making user feel uncomfortable such as generation of undesired sound by noise.

According to this embodiment, if noise happens to be a type meaning an input stop of proper data DATA, it is possible to carry out operation processing on the digital signal DATA accumulated in the data memory 68 at that time, output it and halt operations of the operation processing circuit 65 and data output interface 69 so as to stop data output.

Because the control circuit 63 of this embodiment also carries out the control shown in FIG. 4 so that it is capable of coping with the changeover of the sampling frequency of the input digital signal DATA, the other effect is the same as the first embodiment shown in FIG. 2.

Figure 6:
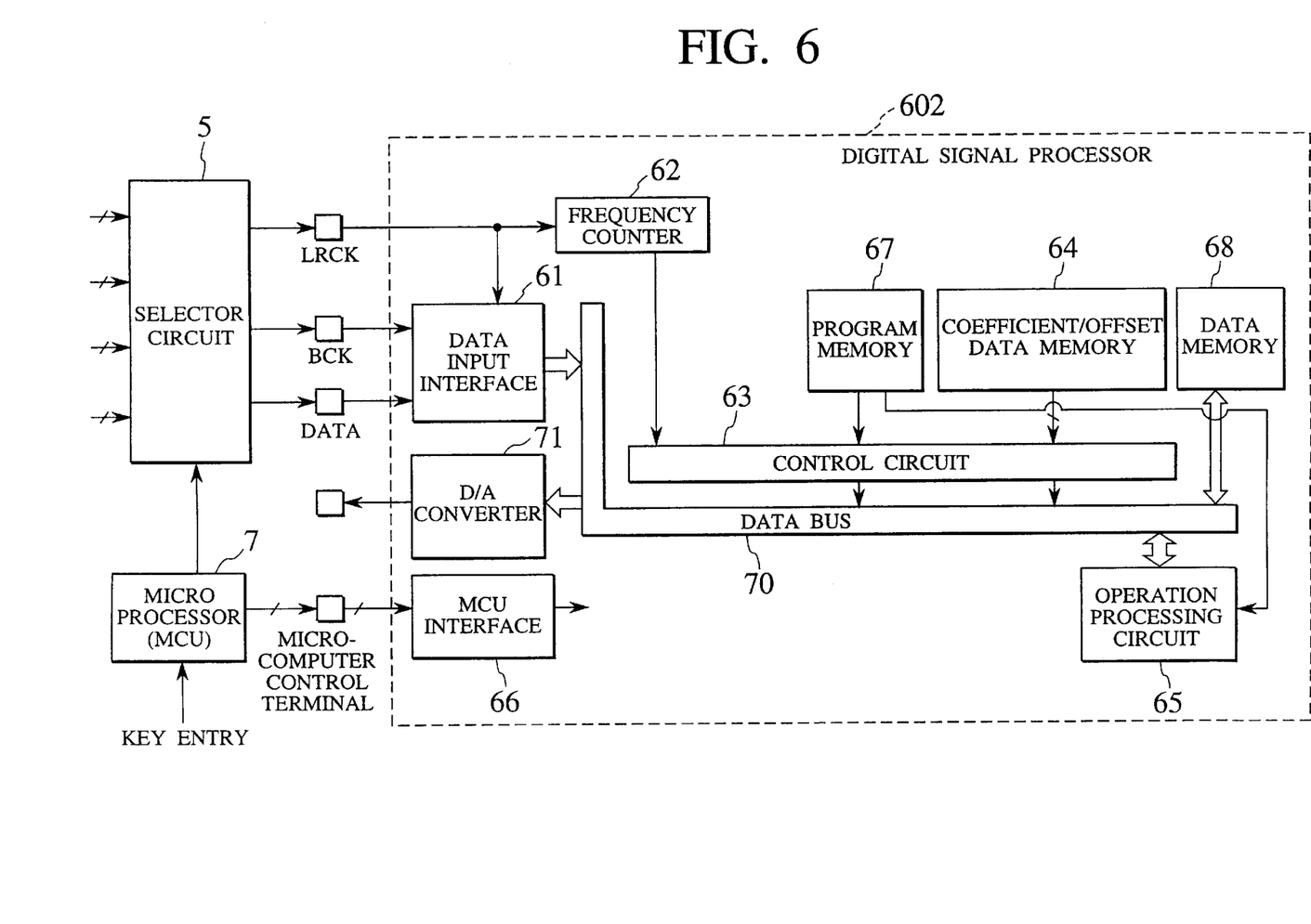
FIG. 6 is a block diagram showing an example of a structure of a third embodiment of the digital signal processor according to the present invention.

FIG. 6 is a block diagram showing a structure of a third embodiment of the digital signal processor of the present invention.

In this embodiment, a D/A converter is contained in the structure of the first embodiment shown in FIG. 2. That is, instead of the data output interface 69 shown in FIG. 2, a D/A converter 71 is provided. Thus, an analog signal is output from a digital signal processor 602 shown in FIG. 6. Under such a structure, the control circuit 63 carries out the same control processing as the first embodiment. It is needless to say that the same control processing as the second embodiment may be carried out.

As described above, it is possible to construct a digital signal processor in which the D/A converter is incorporated.

From the foregoing descriptions, according to the respective embodiments of the present invention, the changeover of the processing program and processing data can be executed rapidly corresponding to a changeover of the sampling frequency of an object digital signal for processing, without any special load on an outside control unit and an increase of the price of the apparatus, thereby reducing a processing halt time so as to always output proper audio signal stably.

Further, according to the respective embodiments of the present invention, in case noise exists in the sampling frequency, an appropriate noise countermeasure can be taken thereby preventing an output of uncomfortable sound, without any special load on the outside control unit and an increase of the price of the apparatus.

It should be understood that many modifications and adaptations of the invention will become apparent to those skilled in the art and it is intended to encompass such obvious modifications and changes in the scope of the claims appended hereto.

What is claimed is:

1. A digital signal processor comprising:
    an operation processing circuit configured to selectively input one of a plurality of digital signals having different sampling frequencies from each other and to carry out operation processing on an input digital signal by using a processing program and processing data set corresponding to a sampling frequency possessed by said input digital signal; and
    a controller configured to detect the sampling frequency of the input digital signal and control said operation processing circuit so as to carry out a processing corresponding to the detected sampling frequency.

2. A digital signal processor according to claim 1 wherein, upon detecting that the sampling frequency of the input digital signal is changed over, the controller sets a processing program and processing data corresponding to the changed-over sampling frequency in said operation processing circuit.

3. A digital signal processor according to claim 2 wherein said controller comprises:
    a memory configured to store a plurality of processing programs and a plurality of processing data corresponding to sampling frequencies of the plurality of digital signals to be input;

a frequency counter configured to detect the sampling frequency of the input digital signal; and a control circuit, configured to read a processing program and processing data corresponding to the detected sampling frequency and then set the processing program and processing data in said operation processing circuit when said frequency counter detects that the sampling frequency of the input digital signal is changed over.

4. A digital signal processor according to claim 3 further comprising:

a digital signal memory configured to temporarily store the input digital signal, wherein, when said frequency counter detects that the sampling frequency of the input digital signal is changed over, said control circuit stops a supply of the input digital signal to said digital signal memory, and then stops an operation of said operation processing circuit after the input digital signal accumulated in said digital signal memory at a time of the detection is processed by said operation processing circuit, and then reads a processing program and processing data corresponding to the detected sampling frequency and sets the processing program and processing data in said operation processing circuit.

5. A digital signal processor according to claim 1 wherein, upon detecting that the sampling frequency of the input digital signal deviates, said controller stops a supply of the input digital signal to said operation processing circuit, and upon detecting that the sampling frequency of the input digital signal is stabilized, said controller restarts the supply of the input digital signal to said operation processing circuit.

6. A digital signal processor according to claim 1 further comprising a digital signal memory configured to temporarily store the input digital signal, wherein, upon detecting that the sampling frequency of the input digital signal deviates, said controller stops a supply of the input digital signal to said digital signal memory;

said operation processing circuit continues processing of the input digital signal accumulated in said digital signal memory at a time of the detection; and upon detecting that the sampling frequency of the input digital signal is stabilized, said controller restarts the supply of the input digital signal to said digital signal memory.

7. A digital signal processor according to claim 1 wherein, upon not detecting the sampling frequency, said controller stops an operation of said operation processing circuit.

8. A digital signal processor according to claim 1, further comprising a digital signal memory configured to temporarily store the input digital signal, wherein, upon not detecting the sampling frequency, said controller stops an operation of said operation processing circuit after the digital signal accumulated in said digital signal memory at a time of the non-detection is processed by said operation processing circuit.

9. A sampling frequency changeover control method for a digital signal processor having an operation processing circuit configured to selectively input one of a plurality of digital signals having different sampling frequencies from each other and to carry out operation processing on an input digital signal by using a processing program and processing data corresponding to a sampling frequency possessed by the input digital signal, said method comprising the steps of:

detecting the sampling frequency of the input digital signal;

when the detecting step detects that the sampling frequency of the input digital signal is changed over, reading a processing program and processing data corresponding to the changed-over sampling frequency from a memory storing a plurality of processing programs and a plurality of processing data corresponding to sampling frequencies of a plurality of digital signals to be input; and setting the processing program and processing data in said operation processing circuit.

\* \* \* \* \*